United States Patent [19]

Aldrich

[11] Patent Number: 5,748,899
[45] Date of Patent: May 5, 1998

[54] METHOD AND SYSTEM FOR COLLECTING AND PROCESSING BAR CODE DATA

[75] Inventor: Rodney D. Aldrich, Brighton, Mich.

[73] Assignee: Lowry Computer Products, Inc., Brighton, Mich.

[21] Appl. No.: 805,061

[22] Filed: Feb. 24, 1997

Related U.S. Application Data

[63] Continuation of Ser. No. 448,893, May 24, 1995, abandoned, which is a continuation of Ser. No. 692,730, Apr. 29, 1991, abandoned, which is a continuation of Ser. No. 579,931, Sep. 7, 1990, abandoned.

[51] Int. Cl.[6] ............................................. G06F 15/177
[52] U.S. Cl. ................................. 395/200.52; 395/500
[58] Field of Search ........................... 395/200.5, 200.51, 395/200.52, 500

[56] References Cited

U.S. PATENT DOCUMENTS

| | | | |
|---|---|---|---|
| 4,266,271 | 5/1981 | Chamoff et al. | 395/200.39 |
| 4,588,881 | 5/1986 | Pejas et al. | 235/385 |
| 4,723,212 | 2/1988 | Mindrum et al. | 395/214 |
| 4,816,824 | 3/1989 | Katz et al. | 340/825.34 |
| 4,866,257 | 9/1989 | Elliott et al. | 235/436 |
| 4,912,309 | 3/1990 | Danielson et al. | 235/380 |
| 4,920,488 | 4/1990 | Filley | 395/228 |
| 4,947,028 | 8/1990 | Gorog | 395/226 |
| 5,036,479 | 7/1991 | Prednis et al. | 364/571.02 |
| 5,077,694 | 12/1991 | Sansone et al. | 395/615 |
| 5,079,714 | 1/1992 | Manduley et al. | 364/478.07 |
| 5,125,091 | 6/1992 | Staas et al. | 395/671 |
| 5,159,180 | 10/1992 | Feiler | 235/375 |
| 5,239,487 | 8/1993 | Horejsi et al. | 364/552 |
| 5,291,399 | 3/1994 | Chaco | 395/203 |

OTHER PUBLICATIONS

Scan Ware Installation Guide, Version A/1.0, Sep. 1988.
Scan Ware Base System User's Manual, Version 1.3, Sep. 1988.

*Primary Examiner*—William M. Treat
*Assistant Examiner*—Kenneth R. Coulter
*Attorney, Agent, or Firm*—Harness, Dickey & Pierce, P.L.C.

[57] ABSTRACT

Method and system for the on-line, real-time collection and processing of bar code data utilizing a bar code data collection network, at least one work station and a host computer having a database, such as a relational database, is provided. Bar code data collection programs can be interactively developed and/or modified from the workstation which is programmed with menu-driven software. Bar code transactions are interactively defined and validated from the workstation.

8 Claims, 13 Drawing Sheets

CONFIGURE BAR CODE TERMINALS

Driver Number: 1     Line Number: 1

| Term No.: | Name: | Type: | Aux Module |
|---|---|---|---|
| 1 | A101 | LS2220 | Serial |
| 2 | A102 | LS2220 | Serial |
| 3 | A103 | LS2220 | Serial |
| 4 | A104 | LS2220 | Serial |
| 5 | A105 | LS2220 | Serial |
| 6 | A106 | LS2220 | Serial |
| 7 | | | |
| 8 | | | |

| | CONFIGURE BAR CODE TERMINALS | | |
|---|---|---|---|
| Driver Number: 1 | | Line Number: 1 | |
| Term No.: | Name: | Type: | Aux Module |
| 1 | A101 | LS2220 | Serial |
| 2 | A102 | LS2220 | Serial |
| 3 | A103 | LS2220 | Serial |
| 4 | A104 | LS2220 | Serial |
| 5 | A105 | LS2220 | Serial |
| 6 | A106 | LS2220 | Serial |
| 7 | | | |
| 8 | | | |

BAR CODE EXECUTIVE CONTROL

Driver ID: 1

| | STATUS | Date | Time | User |
|---|---|---|---|---|
| Bar Code Executive | : ACTIVE | 09/29/88 | 15:53:14 | System |
| Network Polling | : ENABLED | 09/29/88 | 13:54:34 | abc |
| Extended Processing | : ENABLED | 09/29/88 | 13:54:34 | abc |
| Transaction Tracing | : TO SCREEN | 09/29/88 | 13:54:34 | abc |
| Transaction Tracing | : ENABLED | 09/29/88 | 13:54:34 | abc |
| Command | : | | | |

| Emp. No. | Emp. Name | Dept. No. |
|---|---|---|
| 00001 | Anderson | 001 |
| 00002 | Brooks | 002 |
| 00003 | Davis | 003 |
| 00004 | Clark | 001 |

Figure 7

|     |                        |
| --- | ---------------------- |
| 1:  | DATA COLLECTIONS       |
| 2:  | APPLICATIONS           |
| 3:  | APPLICATIONS DEVELOPMENT |
| 4:  | HOST COMMUNICATIONS    |
| 5:  | THE SCHEDULER          |

SELECTION: [          ]

Figure 8

ABSENCES BY BADGE #

Employee Badge Number . . . . 0001
Employee Name . . . . . . . . . . Anderson

| Date | Code | Reason |
| --- | --- | --- |
| 09/23/87 | V | Vacation |
| 09/26/87 | S | Sick |
| 09/27/87 | V | Vacation |

| | FIELD DEFINITION | | | | | |
|---|---|---|---|---|---|---|
| Table Name | | Desc. | | Data Table Created | | |
| Column Name | Col Type | Col Len | No. Dec | Entry R F | Input Mask | -Range Test- From  To |
| 1 | | | | | | |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |

| | FIELD DEFINITION | | | | | |
|---|---|---|---|---|---|---|
| Table Name  EMPLOYEE | | Desc.  Company Employees | | Data Table Created  N | | |
| Column Name | Col Type | Col Len | No. Dec | Entry R F | Input Mask | -Range Test- From  To |
| 1  emp. no | C | 5 | 0 | Y N | XXXXX | |
| 2  emp. name | C | 20 | 0 | Y N | XXXXXXXXXXXX | |
| 3  dept. no. | C | 3 | 0 | Y N | XXX | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |

Figure 11

INDEX MAINTENANCE

| Table Name | | Key No. | | Key Type | | | Key Attributes | |
|---|---|---|---|---|---|---|---|---|
| Key No. | Seg No. | Column Name | Column Type | Len | Dec | Key Type | Key Attributes | |

Figure 12

INDEX MAINTENANCE

Table Name EMPLOYEE  Key No. 1  Key Type A  Key Attributes U

| Key No. | Seg No. | Column Name | Column Type | Len | Dec | Key Type | Key Attributes |
|---|---|---|---|---|---|---|---|
| 1 | 1 | emp. no. | C | 5 | 0 | Ascending | Unique |
| 2 | 1 | emp. name | C | 20 | 0 | Ascending | Duplicates |

Figure 13

```
                    IMPORT MAINTENANCE

Table Name            File Type (F/V)         Field Separator
Fixed Record Length   Auto Update             Fast File Open
DOS Path Field No.    Field Start    Field Length    Column Name 1            0              0
         2            0              0
         3            0              0
         4            0              0
         5            0              0
         6            0              0
         7            0              0
         8            0              0
         9            0              0
        10            0              0
```

Figure 14

```
                    PURGE MAINTENANCE

Table Name
Purge Mode
Retention Period
Column Name
Fast Open
DOS Path
```

Figure 15

FIELD DEFINITION

Transaction 10    Desc. LOG OUT TOOLS    Table Name LOG_OUT

Online Communications N    Chain to Trans. No. 0    Data Table Created N
Interactive Trans.    N    Repeat Transaction    N
Insert Trans in Table    N    Start Chain Here    Y

| Column Name | Col Type | Col Len | No. Dec | Entry R F | Input Mask | Range Test From | To |
|---|---|---|---|---|---|---|---|
| 1 emp. no. | C | 5 | 0 | Y N | XXXXX | 0 | |
| 2 tool ID# | C | 4 | 0 | Y N | XXXX | 0 | |
| 3 date out | D | 4 | 0 | Y N | 99/99/99 | 0 | |
| 4 time out | T | 4 | 0 | Y N | 99:99:99 | 0 | |
| 5 return | D | 4 | 0 | Y N | 99/99/99 | 0 | |
| 6 | | | | | | | |
| 7 | | | | | | | |
| 8 | | | | | | | |
| 9 | | | | | | | |
| 10 | | | | | | | |
| 11 | | | | | | | |
| 12 | | | | | | | |

Figure 16

PROMPTS AND VALIDATION

Transaction 10    Table Name LOG_OUT    Description LOG OUT TOOLS

| Column Name | Bar Code Prompt | Validation Table | Key | Seg |
|---|---|---|---|---|
| 1 employee # | Please enter your ID #. | employee | 1 | 1 |
| 2 tool ID # | Please enter the tool #. | tool | 1 | 1 |
| 3 date out | | | | |
| 4 time out | | | | |
| 5 return | Please enter expected return date. | | | |
| 6 | | | | |
| 7 | | | | |
| 8 | | | | |
| 9 | | | | |
| 10 | | | | |
| 11 | | | | |

METHOD AND SYSTEM FOR COLLECTING AND PROCESSING BAR CODE DATA

This is a continuation of U.S. patent application Ser. No. 08/448,893, filed May 24, 1995, now abandoned, which is a continuation of Ser. No. 07/692,730, Apr. 29, 1991 now abandoned, which application is a continuation of U.S. patent application Ser. No. 07/579,931 filed Sep. 7, 1990 now abandoned.

TECHNICAL FIELD

The present invention is related to methods and systems for setting up a bar code network of data collection terminals from a central location and testing the data collection terminals from the central location.

BACKGROUND ART

Bar coding used for the identification of employees, tools, parts, etc. is now a well-known and proven input technology. Use of bar code scanning for data entry is rapidly replacing the keyboard, the once dominant input technology in many applications.

This swift change is the result of several factors. With bar code scanning, overall data entry performance improves because the equipment is easy to use. Less labor is involved, since typing is not required. Because there is no typing, spelling errors and other "typos" are essentially eliminated. Accuracies of over 99% are the norm. Language barriers are non-existent; in fact, reading ability may not even be a factor as audible signals replace text as the means to indicate successful/unsuccessful completion of data entry.

While the use of bar codes in the United States dates from the 1950's, only recently has bar code technology been combined with another well-known and proven technology, the database. By combining these technologies, powerful features can exist for collecting data and utilizing the database for processing the data.

U.S. Pat. No. 4,912,309 discloses a point of sale system comprising a terminal with input or output devices including a manual data input, a coded data input (i.e., bar code scanner), an on-line display, and a hard copy output. A primary processing module has ten expansion connectors such that the primary module can become any level of processor from powerful peripheral controller to a master processor with a large non-volatile database.

Previous attempts of combining bar code data collection with a database offered little interaction between the data collection system and the database. The results of the bar code scanning were placed in a file. The operator then designed and developed a separate program whose purpose was to interact with the database. If the data collected was to be added to the database, another program had to be written to import the data into the database. As data collection needs have expanded, this has become an increasingly time consuming process.

Specifically, one prior art approach to the problem allowed the import of data into the database. However, a problem with that approach is that if more than one transaction is entered from multiple terminals, the system must wait for each transaction to be separately processed.

Another prior art approach is to collect and process bar code data, on-line and in real-time, utilizing database and transaction definition logic, and at least one workstation having multi-tasking capability so that transactions are processed substantially simultaneously. That prior system is also capable of collecting and processing bar code data, on-line and in real-time, utilizing a host computer and at least one workstation having multi-tasking capability so that transactions are processed substantially simultaneously, and wherein a terminal of the host computer is emulated. Such prior system is shown in FIGS. 6-21.

SUMMARY OF THE INVENTION

A primary object of the present invention is to provide method and system for setting up a bar code network including at least one data collection terminal for use with a host computer having at least one database, wherein the at least one database is selected and the at least one terminal is configured and tested from a central location.

In carrying out the above object and other objects of the present invention, a method is provided for setting up a bar code network from a central location according to the requirements of a user for use with a host computer. The network includes at least one data collection terminal and a controller for transmitting and receiving bar code data to and from the at least one terminal over a communications line. The method includes the steps of selecting the at least one database, configuring the at least one terminal and testing the at least one terminal. Each of the steps of selecting, configuring and testing is performed from the central location.

Also provided are systems for carrying the above methods.

The advantages of the above-noted method and corresponding system are numerous. For example, the complete network of data collection terminals can be tested from a central location without having to test each terminal out in a factory or manufacturing plant where the terminals are typically used. At the central location, the entire network is tested with an easy-to-use screen.

The above objects and other objects and features of the invention will be readily known to one of ordinary skill in the art from the following detailed description of the best modes for carrying out the invention when taken in connection with the accompanying drawings.

BRIEF DESCRIPTION OF THE DRAWING FIGURES

FIG. 3 is a diagram of a bar code terminal configuration form;

FIG. 4 is a diagram of a bar code network executive control form;

FIG. 7 is a diagram of a known data table definitions menu;

FIG. 8 is a diagram of a known screen form having a scrollable region;

FIG. 9 is a diagram of a known field definition form;

FIG. 10, is a diagram of known field definitions for a sample table;

FIG. 11 is a diagram of a known index maintenance form;

FIG. 12 is a diagram of known field definitions for the index maintenance form;

FIG. 13 is a diagram of a known import maintenance form;

FIG. 14 is a diagram of a known setup purge screen form;

FIG. 15 is a diagram of known field definitions for a sample transaction;

FIG. 16 is a diagram of a known prompts and validation form;

BEST MODE(S) FOR CARRYING OUT THE INVENTION

Figure 1:
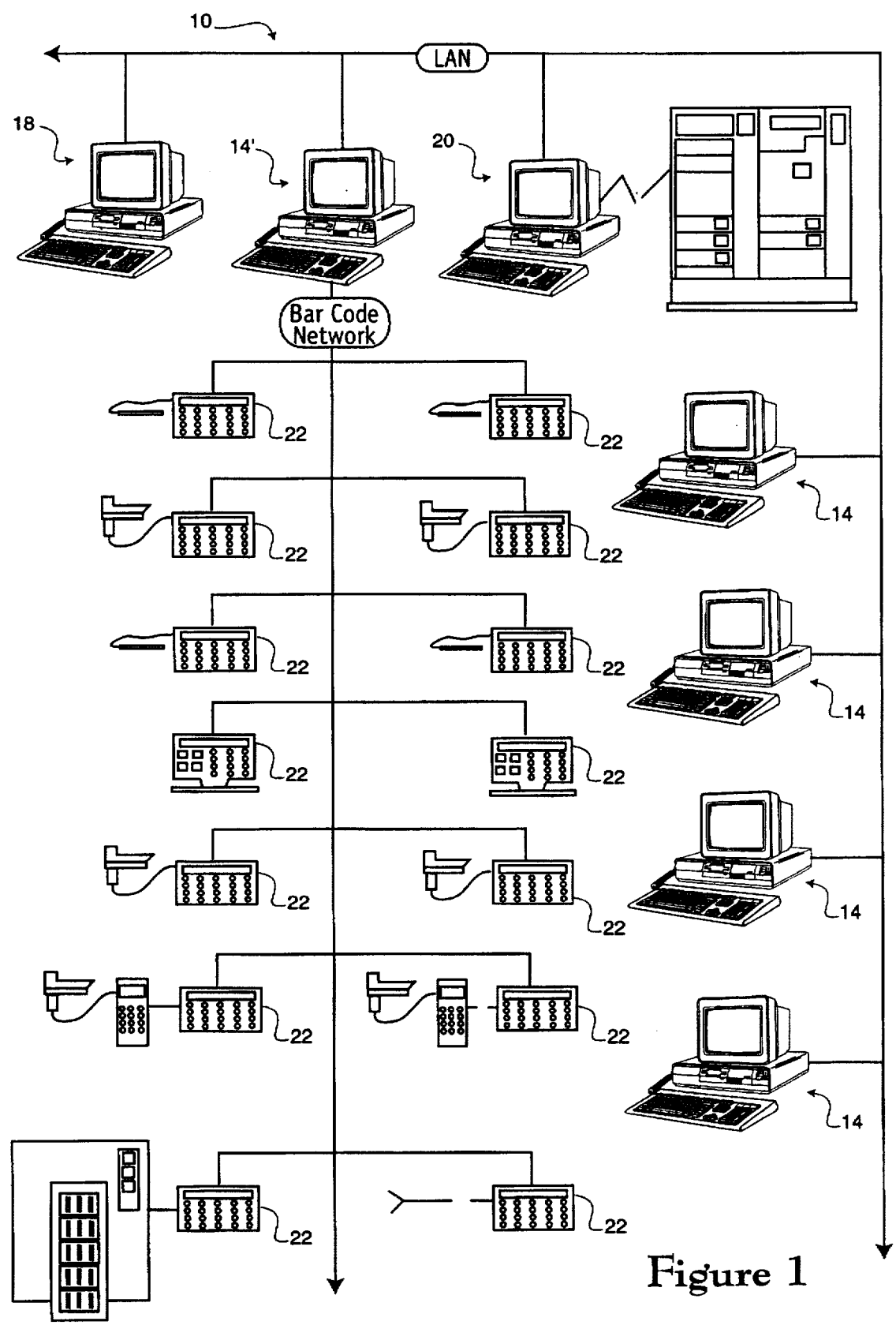
FIG. 1 is a schematic diagram illustrating a personal computer data collection and processing network utilizing the method and system of the present invention.

Referring now to the drawing figures, there is illustrated in FIG. 1 a system, generally indicated at 10, for collecting and processing bar code data. The system 10 includes a bar code data collection network generally indicated at 11, a plurality of workstations 14 and 14' and a host computer 16. The system 10 is illustrated as a local area network (LAN) further including a file server 18 and a gateway 20 connected to host computer 16. However, it is to be understood that a single workstation connected directly to the host computer 16 may also utilize the method and system of the present invention.

The file server 18 may be a LAN server with a 286-type microprocessor, a 70 MB hard drive with a Novell Network, 2 MB RAM, a monochromatic display, and a 1.2 MB floppy disk drive.

The gateway 20 may be a LAN gateway workstation with a 286-type microprocessor.

The workstation 14' may be a LAN terminal network controller with a 286-type microprocessor, capable of handling 64 devices. The workstation 14' may have an installed Ethernet and controller card, have a monochrome display and a 1.2 MB floppy disk drive.

The network 11 includes bar code data collection terminals 22 connected to a controller or bar code workstation 14' that sends and receives data to and from the bar code data collection terminals.

Before transactions can be sent across the network from the terminals to the workstation 14' to be processed, the network must be setup. To do this, the user must select a database, configure and test the terminals 22, configure mirror-imaging and assign printers such as printer 24, to a terminal. Screen forms assist the user throughout the setup process.

Figure 2:
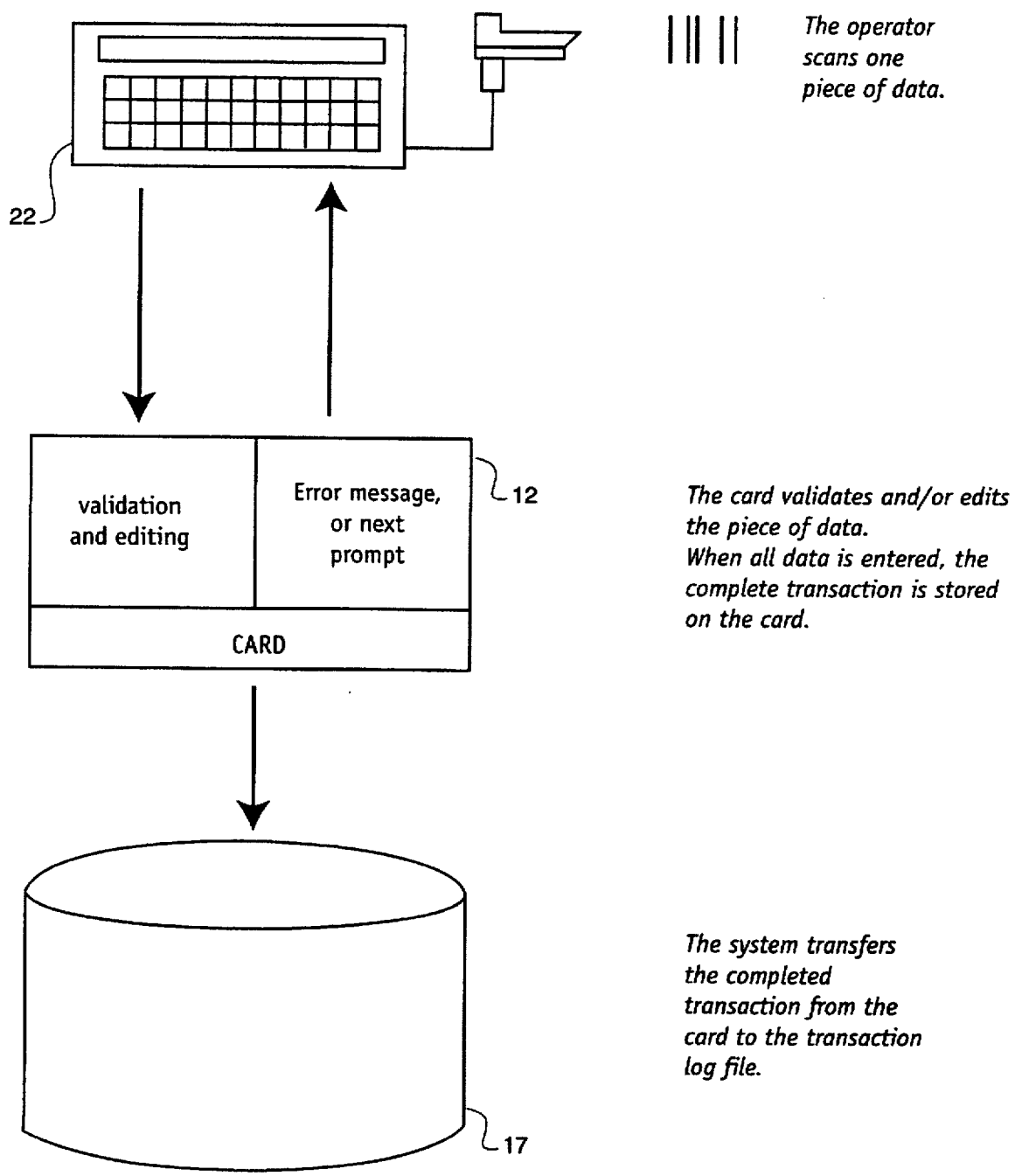
FIG. 2 is a schematic diagram illustrating the method and system for collecting and validating a transaction.

When the user selects a database, the user is actually assigning a co-processor card 12, as indicated in FIG. 2, of the workstation 14' to the database. A pop-up menu lists the available database to select. This assignment tells the system where to put incoming transactions, as well as where to find the appropriate validation data and processing programs.

In a preferred embodiment, the system 10 is designed for use on IBM's OS/2™ operating system. In this embodiment, a co-processor card does not have to be installed in the dedicated bar code collection workstation 14'.

The hardware associated with the OS/2™ environment performs the same tasks as co-processor card 12. This embodiment supports all of the system features and options of the first embodiment, as discussed below.

Transaction definitions and validation tables are stored in memory, instead of being downloaded to the card 12. Routine editing and validation performed by the card 12 as described hereinbelow is still performed. An example of the differences is the way in which terminal ID numbers are assigned (a card number is not a part of the ID number).

The OS/2™ system is a multi-tasking environment. Operation of the preferred embodiment is faster because of the way transactions are processed. In the embodiment with the card 12, a network having many terminals such as twenty (20), could submit transactions to card 12 at essentially the same moment. The transactions, however, are removed one-by-one from card 12 and processed. Assuming a one second processing time, one terminal will have to wait 20 seconds before completing another transaction.

In the preferred embodiment, if these same terminals again submit twenty (20) transactions at essentially the same moment, the multi-tasking capability of the OS/2™ environment allows these transactions to be processed substantially simultaneously.

The preferred embodiment also makes use of a graphical user-interface similar to the interface employed on MacIntosh™ systems. Instead of using text menus, the graphical user-interface makes use of pictures known as icons. These pictures typically represent the function performed by the selection.

To configure the terminals 22, the user uses the "Bar Code Terminal Configuration" screen form, shown in FIG. 3. The driver number refers to the software that controls the bar code network. This software may be written in the C Programming Language. Depending on the size of the network, multiple drivers may be required. The line number refers to the co-processor card 12. There are two lines for each card.

After a line has been specified, the user may configure the communications for the line using a pop-up menu. This menu allows the user to set the baud rate, the number of data and stop bits, the parity and any terminators. Default values are provided for those who are unfamiliar in specifying communications.

The remainder of the configure screen contains a scrollable region 26. The "Term No." is a display only field and refers to the terminal number (1–32). The terminal number represents the address given to the terminal when it was installed. The "Name", "Type" and "Aux. Mode" configuration parameters will be assigned to the terminal at that address on the specified line of co-processor card 12.

The "Name" column is also a display only field, and automatically displays each terminal name. A name consists of the card (A), the line (1–2) and the address (1–32). For example, name A102 represents the terminal at address 02, attached to line 1 of card A.

The "Type" column is used to specify the terminal model number. A pop-up menu provides the available model numbers. This information is used by the software for things like setting default communication parameters.

The "Aux. Module" column is used to specify the auxiliary module for each terminal. The user can select serial, UDI, or none. If serial or UDI is chosen, a pop-up menu appears and allows the user to configure the communications (baud rate, data and stop bits, parity, handshake and location). Again, default values are provided for those unfamiliar with communication parameters.

After configuring the terminals 22, the user must test the terminals 22 for functionality and communication to the co-processor card 12. A screen form allows the user to specify which terminals to test, where to send the test results and how may test cycles to perform.

The user can select a testing of all of the terminals 22 on the network 11, or just to test one specific terminal (by specifying the terminal ID). A pop-up menu helps the user select the terminal ID, which consists of the driver, line number and terminal number. Testing can be accomplished by sending one message to a terminal 22, or by specifying how many times the test should be repeated. The results of the test can be sent to either the terminal display or to a printer. These results, in the form of a report, will indicate a correct communication configuration, or if the configuration needs to be modified.

A powerful feature of the system 10 is the capability to configure mirror imaging. By simply using a screen form to specify a DOS path, the user can opt to maintain a "mirror image" of a transaction log file 17. The DOS path specifies the name and location of the duplicate file. In general, all transactions collected by the bar code network are stored in the transaction log file 17. Mirror imaging maintains an exact duplicate of every record in log file 17. In this way, a backup is always available. Because mirror imaging can degrade performance while operating, the default is for no mirror imaging.

The system 10 also provides the capability to assign printers to specified terminals on the network. This feature allows multiple data collection terminals to share the same printer. The assignment of a printer to a specified terminal is accomplished by specifying a destination terminal where printer output should be sent for each terminal on the bar code network.

Although much of the subject matter discussed hereinbelow under the headings "Network Control", "Database Maintenance", "Data Collection Transactions", "Collecting and Processing Data", "The Processing Software", "The Communications Software", "System Screen Painter", "The System Report Writer", and "Administration" is known (relating to drawing FIGS. 6–21), such subject matter is helpful in understanding the associated subject matter of the present invention.

Network Control

Once the network has been properly configured and tested and is operational, the user can use the system's network control utilities to monitor and control the system 10 and download validation tables and transaction definitions to co-processor card 12.

The user can monitor and control the functioning of the system using the "Executive Control" screen, shown in FIG. 4. This form can be used to start and stop network polling of the co-processor card 4 for transactions, start and stop extended processing (execution of processing programs), start and stop tracing of all activity on the network, view totals of polled and queued transactions and to view bar code network errors.

The network polling option acts as a toggle to enable or disable this function. The status column indicates whether or not polling is currently enabled or disabled. When polling is first disabled, the system will process the transactions already in log file 17. Disabling polling closes the transaction log file and error log file, allowing the user to backup or purge these files without powering down the system.

Although polling is disabled for back-ups and purges, card 12 continues to queue transactions.

The extended processing option acts as a toggle to enable or disable the processing of transactions. As described herein in greater detail, when processing is enabled, the system 10 takes transactions from log file 17, initiates execution of the processing program (if one exists), and then updates the status to reflect the processing outcome.

Disabling processing closes all data tables opened during processing, allowing the data in these tables to be backed-up. When processing is first disabled, transactions awaiting processing will remain unchanged in log file 17 until this option is enabled. Although processing is disabled, transactions are still inserted in log file 17 (assuming polling is enabled); they just are not being removed from the file and processed.

The transaction tracing option allows the user to display the transactions being handled by the system. A pop-up menu lets the user disable the option, or send the tracing information to the screen, a file or a printer. Although enabling tracing will degrade system performance, it is often useful for trouble-shooting.

As transactions are removed from co-processor card 12, the system 10 maintains a count of the transactions. Using a screen form, the user can view all polling and transaction activity for a driver. A "Poll Total" field shows how many transactions were pulled off of card 12. A "Transaction Total" field shows the number of transactions that were processed by processing programs. A scrollable region displays polling total for each bar code terminal 22 on the network 11.

Lastly, errors occurring on network 11 can be viewed. After specifying a starting date, a scrollable region will contain all the errors that have occurred on or since that date.

Each time network 11 is initialized, validation tables are automatically downloaded to co-processor card 12. Since it is common to modify database data throughout the day, the user can send updated validation tables to card 12 one at a time using the "Download a Validation Table" tool.

A pop-up menu provides the user with a listing of all data tables. When one is selected for updating, the function retrieves the most current values from the database table columns selected for validation, creates the validation tables and downloads them to card 12. Entered data is then compared against the updated validation tables.

Similarly, all transaction definitions are downloaded to card 12 when network 11 is initialized. The user selects a transaction number, a new transaction description file is created and downloaded to card 12.

Figures 5, 6:
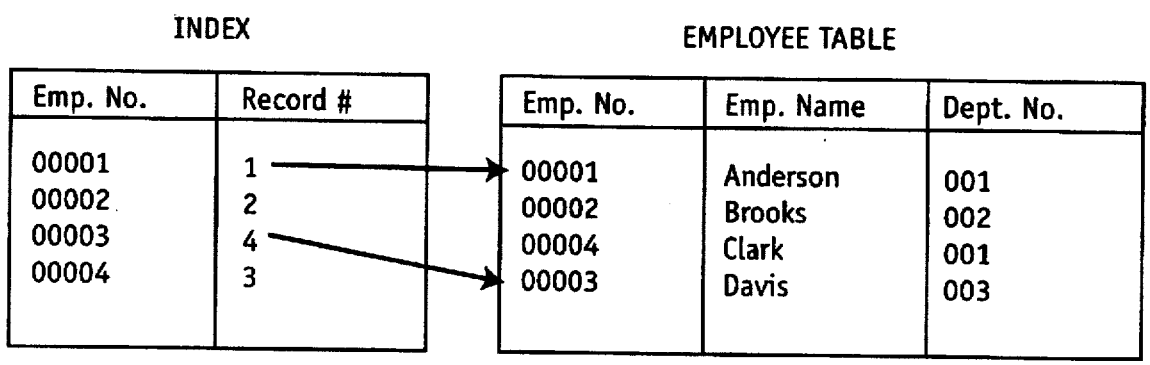
FIG. 5 is a diagram of a sample employee table of a relational database.
FIG. 6 is a block diagram of a known employee table and its relationship to a database index.

The present invention makes use of a relational database which contains tables made up of rows and columns of information. The column's name typically describes the category or type of information stored in that column. For example, a table named EMPLOYEE might have columns names "employee number", "employee name" and "department number." A row stores one value for each of the columns of any table. Because a row provides all of the information for one entry in the table, rows are also referred to as records. A sample EMPLOYEE table is shown in FIG. 5.

When the user wants to retrieve data (i.e. a record) from the database, a computer may look through the entire table, examining each and every record. Because this could take a considerable amount of time if the table is large, the present invention makes use of an index to speed data retrieval. The system maintains indexes of particular columns that have been designated by the user as keys.

A database index is analogous to the index found in a book. A book's index contains topics (i.e. car engines) and pointers (i.e. page numbers) to where each topic is located. Similarly, a database index contains topics and pointers. The topics are values of columns designated as keys (i.e. employee numbers) and the pointers point to the record that actually contains each value. FIG. 6 is a graphic representation of an index and its relationship to a table.

In addition to speeding data retrieval, designating columns as keys can permit data to be retrieved in a certain order. For example, if the "employee number" column was designated as a key, employee records can be retrieved in employee number order even though they are stored in alphabetical order.

While an index typically stores values for only one key column of a table, it is sometimes desirable to combine two or more columns to make one key. If two columns are combined, each column is a segment of the two-segment key. By using two-segment keys, records containing a particular combination of values can be located quickly and efficiently in one search. For flexibility, the present invention enables the user to create up to a five-segment key.

Before data can be retrieved from the database table, the database tables must be defined and created. The present invention makes full use of user-friendly screens to accomplish these tasks. The screens are used to display hierarchal menus. Each numbered item, or choice, on the first menu often invokes another menu of choices. This sub-menu may in turn invoke another sub-menu. A typical menu is shown in FIG. 7.

When the user chooses an item, that item's menu is layered on top of the previous menu. In this way, the user can always see his position in the hierarchy at a glance. As familiarity with the system increases, the user can quickly access sub-menu choices by simply typing the numbers of the menu items desired, with each number separated by a space. For example, to select the third choice on the first sub-menu, the user would enter "1 3".

When a menu item does not display another menu of choices, a screen form is displayed. Forms provide the user with a view of the database tables that store the data. The three main uses of screen forms are for entering information into the database, retrieving information from the database, or updating (i.e. modifying) database information.

Forms are made up primarily of fields that display or accept information, allowing the user to modify or view database data. A message area of the screen is used for prompts and messages to help the user. For example, the user might be prompted to confirm a request.

Screen form fields are either "display only" or "entry". While "display only" fields only display information to the user, "entry" fields display to and accept information from the user. Fields can be defined to display and/or accept the known character, numeric, integer, long integer, date or time data types. To simplify the use of the "entry" fields, the user may be able to pop up a menu of valid entries. The user can then select an entry from the pop-up menu, or typing an entry without using the menu.

Screen forms may have scrollable regions. Scrollable regions display rows and columns of information. Often there is too much information to fit onto one screen. By using certain keyboard keys, the user can scroll (i.e. move) information into and out off these regions. A screen form having scrollable region 28 is shown in FIG. 8.

Database Maintenance

To define a database data table structure and then create the physical table, the user uses screen forms. The first form is used to define fields, and is shown in FIG. 9. The user must first specify a unique name for each table, and give a brief description of the general type of data to be stored. The "Data Table Created" field is a "display only" field, and informs the user if the physical table has been created (the physical table is NOT created by defining it).

A scrollable region 30 is used to define the columns of information to be stored in the table. For each column of the table, the user must specify the attributes regarding column name, column type, column length, decimal places, user entry, masking and validation.

Column name should identify the type of field to be stored in the column, while column type should identify the type of information to be store in the column. Possible types include character (any printable characters), integer, long integer, numeric, date (month, day, year), time (in military format) or sub-field. The sub-field option should be chosen to create a column out of a portion of the previously defined character column. For example, if a ten (10) character "Project ID" character column is defined, a three (3) character sub-field could be defined on the next line. The main column would store the entire piece of data, however.

For character and sub-field columns, the user specifies the maximum number of characters this field can store. For the other field types, this column is "display only" column, and a value representing bytes of memory automatically appears. If the column is defined to be numeric, the user specifies the number of decimal places allowed.

The user entry attributes are used to indicate if user entry is required ("Entry R" attribute) and if the user entry must fill the width of the column ("Entry F" attribute). "Y" or "N" are valid entries for these attributes.

The input mask field is initially displayed with a sufficient number of default mask characters to fill the column. Default mask characters are used to indicate the type of data to be stored in the field. For the character and sub-field types, the default mask character is "X". For the remaining types, the default mask character is "9". Date columns also include slashes; time columns include colons; and numeric columns contain a decimal point. For example, an input mask as seen on a screen form for a character type is XXXXXX, and an input mask for a date type is 99/99/99.

Special mask characters can also be used to customize data table structure and content. If a character position in the input mask id enclosed in square brackets ([]), incoming characters in those positions will be stripped off and not stored in the database. If a character(s) is placed inside angled brackets (<>), any one of those character is allowed as an entry. If a character is enclosed in quotes (""), the incoming character must match it exactly. This is used for validation purposes. And if the input mask contains the "pound" sign (#), the incoming piece of information must contain a value for each position of the mask having the # sign. For example, <ABC>XXX is a mask for a four (4) character column where the first position can accept an A, B or C and the remaining positions can accept any printable character. And [<AL>]## is a mask for a three (3) character column where the first position can accept either an A or an L and values like 3 and 6 for the last two positions, but stores the data as "36".

For numeric or integer columns, the user can also specify a range for the incoming value. By entering the minimum value in the "from" field and the maximum value in the "through" field, the user can restrict input. A sample Field Definition form with information is shown in FIG. 10.

In addition to the user-defined columns described above, the system generates a DATE, TIME, USER-ID, ACTION and STATUS column for each table. The DATE and TIME columns indicate when the record was inserted in the table or last updated and the USER-ID columns informs who inserted or updated the record. The ACTION column indicates the last database action (i.e. insert, update, etc.) performed on the record and the STATUS column indicates the current status of the record. The columns, referred to as "date and time stamping" columns, are automatically updated each time a record is inserted or modified.

The next step in defining a table is to create one or more indexes for the table. This is accomplished using the Index Maintenance screen form, shown in FIG. 11. The "Table Name" and the "Key No." field are "display only" fields, and displays the name of the previous table and the number of the current key definition. The key number is automatically incremented as key definitions are created. A pop-up menu contains all of the columns of the table previously defined. The user must select one or more columns to be key(s) for the index being created.

After a column has been specified, the user can specify how to order information in the index. For the "Key Type" column, a pop-up menu provides choices for either an ascending ordering of information or a descending ordering of information.

The user uses the "Key Attributes" column to indicate whether the field store duplicate or unique values. Specifying a unique attributes ensures that values are not duplicated in the column. For example, if the table's key is an employee identification number and it is specified as unique, an attempt to enter the same number twice will fail. The remainder of the fields shown on the form are "display only" fields used to display the definition just created. A completed key definition (Index Maintenance screen form) is shown in FIG. 12. Key definitions can be modified and deleted. When a definition is deleted, the key numbers will be adjusted accordingly.

Once the table's structure has been defined (field and key definitions), the physical table that will actually store the entered data is created. This is accomplished through a user-friendly "Data Table Creation" screen form. The user either uses a pop-menu to display a listing of names of data tables defined but not yet created, or types in the name of a table. Duplicate table names are unacceptable.

Once a table has been created, the "Data Table Deletion" screen form can be used to delete a table and the data it stores. This deletion will not affect the table definition, or structure. The user either uses a pop-menu to display a listing of names of created data tables, or types in the name of a created table. With the data deleted, the user can now retrieve and modify the table definition.

The user can, however, modify a data table's definition without deleting the data of the table, using a "Reorganize Tables" tool, or program. This is done by making a copy of the table (making an alternate definition), making the desired changes to the alternate definition using Field Definition and Index Maintenance screen forms, and then replacing the original table with the alternate definition. A user-friendly menu displays these steps, and screen forms are provided for each step of the process.

Using the "List Table Structure" screen form, the user can print out the structure of a table or copy the structure to an ASCII file for future reference. After specifying where the structure is to be reproduced (printer or file), a pop-up menu provides the user with a listing of all the tables in the database. The subsequent listing includes all columns, their attributes, and all key definitions for the table.

Once data tables have been defined, created and filled with data, the system provides a plurality of utilities to maintain the information in the data tables. The first utility allows the user to bring in data in an ASCII format. The first step of importing is to use the Import Maintenance screen form, shown in FIG. 13, to specify the origin of the data to import and the desired destination of the data. The form is used to select a database table to receive the data, indicate how the data should be inserted in the table and to specify the file containing the data to be imported.

Essentially, the first step defines a link between an ASCII file and a database data table. The screen form is completed once for each table that will receive imported data, and the import definition can be modified if necessary.

The screen form is made up of fields and a scrollable region. The user must select a table to receive the imported data as well as the format of the incoming data. Data can be either fixed or variable in length. If each record in the data is the same length, the fixed file type ("F") should be selected. In addition, the fixed record length—the number of characters contained in one record of the file to be imported—must be specified.

If the records in the data to be imported have different lengths and are separated by a field separator, the variable field type ("V") should be selected. In this case, the user must specify the field separator (i.e. a slash, or maybe a vertical line).

The "Auto Update" feature exists because there is a possibility that imported data might duplicate information in a table that accepts only unique information. A "Y" entry indicates the table record will be updated with the incoming data, and a "N" entry will defeat the auto updating, the import will fail and the table record will be unchanged.

With the "Fast File Open" feature, the user can speed up the importing process. Instead of mirror-imaging the database table, a backup copy of the table is made before the importing occurs. This is helpful if large files are being imported.

Lastly, the user must specify the DOS path. As is known, the DOS path specifies the name and location of the file to be imported.

The scrollable region is used to specify how the imported data will be inserted in the database table. Each row in the region corresponds to a column in the table. For fixed file types, the starting position, length and column name must be specified. If the data to be imported is variable in length, only the column name must be specified.

After completing the import definition, the next step is to execute the import. A pop-up menu will list those tables having an import definition, and the user must select a table. Messages relate the status of the import as it occurs. When the import is complete, the user can check for errors. Errors are displayed in chronological order. The complete record is displayed with a brief explanation of the problem.

A second utility program allows the user to export data table information to an ASCII format, or a format recognizable by other software products such as Lotus 1-2-3™ or dBase™. The "Export Data" screen form is used to select a table containing the data to be exported, the records of the table to be exported, and to specify a destination format.

The user first selects a table from the pop-up menu containing all of the tables in the database. Next, the user selects the type of export file to create. Options exist for an ASCII file (fixed or variable record lengths), Lotus import format or dBase III import format. The records to be exported are specified. After the record is exported, the system-generated status field of the table definition is updated to reflect that record has been exported.

The last utility permits obsolete data in database tables to removed. Using a "Purge" utility, the user can purge data from all of the user-defined tables and most of the predefined application tables. A third purge option is for user-specific inventory applications, and will not be discussed in detail.

The "Set Up Purge" screen form, as shown in FIG. 14, is used to make a purge definition by selecting a table to purge, indicating whether to purge by date or by status, and specifying a location for the purge history file. The form is completed once for each table to be purged. Purge definitions are also modifiable.

The user specifies a table to be purged. A name can either be typed in, or selected from the pop-up menu containing table names. Next, a purge mode is be specified. A record can be purged based on its status, or it can be purged based on a date field.

If the date field purge mode is selected, a retention period and a column name is specified. The retention period represents how many days worth of data is to be retained. For example, specifying "30" will result in the last 30 days of data being exempt from the purge. The purge utility searches the date field of the specified column for dates beyond the retention period.

With the "Fast Open" feature, the user can speed up the purging process. Instead of mirror-imaging the database table, a backup copy of the table is made before the purging begins. This is helpful if large files are being purged.

As data is being purged, it is being placed in ASCII format in a file. The DOS path, as is known, specifies the name and location of this file. One row of this file contains one row of data from the table. Fields are separated by a delimiter (i.e. a vertical line).

The user can also purge the transaction logfile and the error logfile. For bar code networks that handle a high volume of transactions, this should be done regularly to prevent this files from becoming full.

With the "Auto Screen Generator" screen form, the user can quickly create a screen form that interacts with a specific database table. Screens that interact with more than one table can be created using the system screen painter, discussed in greater detail below. The form acts as a window into the specified table.

After selecting a table and key (from pop-up menus) that will be used to access the table, the user specify how, if at all, the data in the table can be modified. While the data can always be viewed, the user specifies whether or not the table data can be deleted, modified, or if new data can be added to the table. The defined screen form must then be physically created.

Similarly, a listing of the information in a specific database table can be quickly created using the "Auto Report Generator" screen form. Reports that display data from multiple tables can be created using the system report writer, discussed in greater detail below.

After selecting a table and the key (from pop-up menus) the report will use to retrieve and order the report data, the user selects which data will be reported by selecting columns (also from pop-up menus). Each column's name will appear in the report as a column header. The auto report definition is created after the user specifies whether the report will be sent to the terminal display or the printer.

Data Collection Transactions

With the database defined, the user must define how to collect bar code data and process that data utilizing the database.

While the term "transaction" can describe an entire process of data collection, it can also be used to describe a single part of this process. For example, to perform a "transaction," the operator scans information in response to the prompts that appear on the bar code terminal display. The collected information is called transaction data, or a complete transaction.

A transaction can be any one of three types. The transaction type determines how the collected data is processed. Interactive transactions provide feedback back to the computer terminal. On-line transactions take the collected data and send the data to another computer (i.e. a host). Standard transactions are any transactions that are not interactive or on-line.

A transaction definition consists of the series of terminal prompts together with the specifications or instructions to check the operator's replies. All definitions contain parameters about each piece of information to be collected, and may include instructions on what to do with the collected data.

In the first preferred embodiment, all transaction definitions are downloaded to co-processor card 12 that resides in the dedicated bar code data collection computer or workstation 14'. The card 12 is similar to a co-processor card commercially available from Burr-Brown (P/N TM9000). The card 12 is also known as a terminal network controller board.

Transaction definitions are created using a Transaction Definition utility, or program. To design a transaction, the user works through a series of screen forms. The first screen form is the Field Definition form, and is shown (with information) in FIG. 15. It is used primarily to enter a new database table name to store the collected data, specify column names for each piece of information to be collected, and to define attributes for each column.

The form is made up of two general areas. The top area contains "display only" and "entry" fields which describe the transaction as a whole. Below this area is a scrollable region used to define the pieces of information to be collected by the transaction. The scrollable region is identical to the scrollable region of the Field Definition form for defining database tables.

The user then enters a unique transaction number and a brief description of the type of information to be collected by the transaction. A unique name is assigned to the table that will store the collected data.

An "Online Communications" field is used to indicate whether the user wants the data to be sent on-line to the host mainframe computer 16. Similarly, an "Interactive Trans." field is used to indicate whether the user wants to provide feedback to the workstation 14' before allowing a new transaction to be started. For example, an error message or an acceptance message could be fed back to workstation 14'.

If the transaction is to be automatically inserted in the transaction table as soon as the data is collected, a "Y" entry should be placed in the "Insert Trans. in Table" field. A "N" entry could be used if the user wants to process the data prior to insertion into the table.

The user can then indicate the transaction number of the transaction to be executed immediately after the present transaction is completed. This is called "chaining" the transactions together. The "Start Chain Here" field indicates which transaction is the first of the chain.

The "Repeat Transaction" feature is helpful and time saving if a terminal is used continually for the same transaction. A "Y" entry will result in the transaction being executed indefinitely.

The "Data Table Created" is a "display only" field, and informs the user if the physical table has been created (again, the physical table is NOT created simply by defining it).

The remainder of the screen form (the scrollable region) is identical the Field Definition screen form used to define database tables, already discussed in great detail above. The reader is hereby referred to that discussion for an explanation of the scrollable region.

After completing the Field Definition form, the user completes the Prompts and Validation screen form. This form is used to enter a prompt for each column specified on the Field Definition form. These prompts will be displayed on the bar code workstation 14' while the user is performing the transaction. Also, the user specifies an existing table for validation of collected information. A Prompts and Validation form is shown in FIG. 16.

The upper portion of the form contains three fields, and all are "display only" fields. They contain the transaction number, table name and transaction description provided (by the user) on the Field Definition form.

The lower portion is a scrollable region. The column name field is also "display only," and displays all of the column names entered on the Field Definition form. The "Bar Code Prompt" field contains the exact prompt the user wants to appear on the computer workstation 14'.

The validation feature allows the collected data to be compared to values already stored in the database. For example, a table could be checked to insure the entered employee number is valid. A table name, key number and segment must be specified for validation to occur. Pop-up boxes provides the user with database tables and their respective keys.

From the table, key and segment specified, the system then builds a validation table that is downloaded to card 12. The validation table contains all of the values stored in the database table key column(s) selected for validation. The system regenerates each validation table every time the bar code network is re-initialized, keeping the tables up to date with changes to the database.

The next step in defining a transaction is to create one or more indexes for the table that will store the collected data. As stated above, all tables must have at least one index, whether the table is a database data table or a transaction data table. Since transaction data tables are not accessed frequently (typically they only log collected data), the primary purpose of indexes on transaction tables is to set up unique fields.

The Index Maintenance screen form is utilized for creating the index(es). The Index form for transaction tables is identical to the Index form for database tables, shown in FIGS. 11 and 12. The screen form's fields were discussed in great detail above. The reader is hereby referred to that discussion for an explanation of the form.

With the transaction table's structure defined (field and key definitions), the physical table that will actually store the collected data needs to be created. Similar to database table creation, this is accomplished through the "Data Table Creation" screen form. The user either uses a pop-menu to display a listing of names of data tables defined but not yet created, or types in the name of a table. Duplicate table names are unacceptable.

Once the table has been created, the "Data Table Deletion" screen form can be used to delete a transaction table and the collected data it stores. This deletion will not affect the table definition, or structure. The user either uses a pop-menu to display a listing of names of created transaction data tables, or types in the name of a created table. With the data deleted, the user can now retrieve and modify the table definition.

The user can, however, modify a transaction table's definition without deleting the data of the table, using a "Reorganize Tables" tool, or program. This is done by making a copy of the table (making an alternate definition), making the desired changes to the alternate definition using Field Definition and Index Maintenance screen forms, and then replacing the original table with the alternate definition. A user-friendly menu displays these steps, and screen forms are provided for each step of the process.

Figure 17:
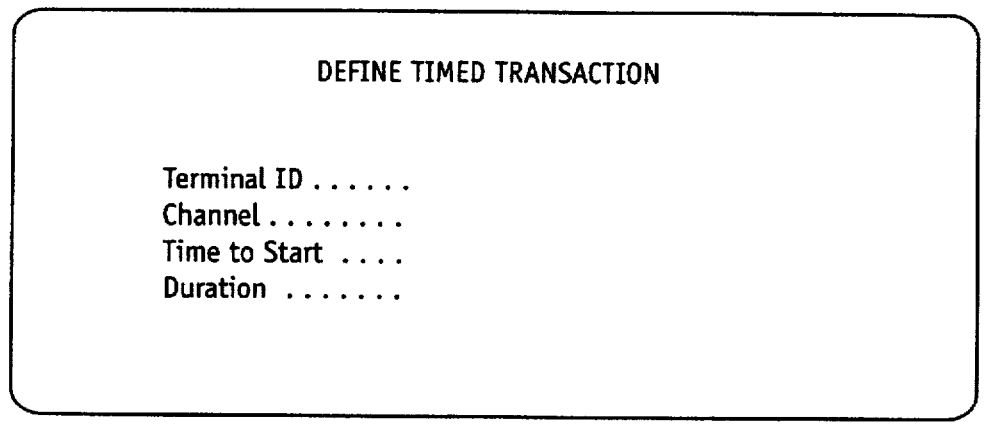
FIG. 17 is a diagram of a known define timed transactions screen form.

The user can create a timed transaction using the "Define Timed Transactions" screen form shown in FIG. 17. Timed transactions, like standard, interactive and on-line transactions, reside on co-processor card 12. But unlike the other transactions, timed transactions do not collect information. Instead, when a specified time arrives, co-processor card 12 electrically activates a device (i.e. bell, security gate) wired to the computer workstation's digital I/O port.

To create a timed transaction, the ID of the terminal that will execute the transaction is specified. An ID consists of a card number, port, and terminal address. For example, A209 is the ID of the second card with address 9 of Port 0 being used to activate the device. The channel of the digital I/O card is also specified.

The time at which the timed transaction is to activate the device is also be specified. In addition, the duration (in seconds) the digital I/O card will activate the device is specified.

Collecting and Processing Data

To make use of the database, bar code data must be collected and processed. Depending on requirements, the routine editing and validating done by the card 12 as specified in the transaction definition may be all the processing needed. If more powerful processing is required, the user can specify extended processing.

If extended processing is required, the user can develop processing programs using processing software developed especially for processing transaction data collected from a network of bar code terminals. The software may be developed using the C Programming Language, a powerful language well known to those of ordinary skill in the art. The programming capabilities provided by the software (discussed in greater detail below) include mathematical calculations, use of WHILE-loops and if-then-else logic. In addition, a wide range of database calls permit the user to insert, update, delete or retrieve database records as required. The user can also specify interaction with terminal display screens, or specify communication with other terminals, printers and the like.

To collect bar code data, the operator enters a transaction definition number at a bar code terminal. The co-processor card responds by sending the prompts for the transaction defined in the transaction definition to the terminal display. As the operator responds to the prompts by entering the requested data, the card validates and edits the data as specified in the transaction definition. When all of the requested data has been entered successfully, the complete transaction is saved on the card.

Meanwhile, the system 10 is polling the card 12 looking for completed transactions. When a complete transaction is found, the system 10 transfers it to transaction log file 17 which resides on the hard disk of fileserver 18 in the LAN configuration of FIG. 1. FIG. 2 shows the path of the transaction data from the bar code computer workstation 14' to log file 17.

As the system inserts the transaction into log file 17, a status is assigned to the new record. A status indicates the next action to taken with the transaction. Depending on the transaction type (defined in the transaction definition, it indicates what kind of extended processing to perform), this initial status will be a "9" for on-line transactions, "10" for standard transactions, or "11" for interactive transactions.

If the transaction has a status of "11", the transaction is an interactive transaction. As previously described, for interactive transactions, the bar code terminal waits for feedback from the processing program before allowing the user to begin a new transactions. To provide quick feedback to the terminal, these transactions are given highest priority.

Accordingly, as soon as the systems finds an interactive transaction, it locates and executes the processing program created for that transaction. After extended processing has occurred, the log file status is updated to reflect the outcome. The new status is a "1" if the processing was successfully completed. No further processing will be performed on the data. If there was a processing error, the new status reflects the appropriate error code. The user can then view the error, change the status and resubmit the data for processing. FIG. 17 shows this extended processing path.

If the transaction has a status of "9", the transaction is an on-line transaction. When a transaction is defined to be an on-line transaction, further processing is pending (i.e. awaits) host communications. Providing for host communications allows the user to define the host communications environment in terms of the type of host computer, such as a mainframe or minicomputer. This allows users to take advantage of the speed and accuracy of on-line bar code data collection without making hardware or software changes to an existing system, which usually represents an already significant investment.

The system 10 uses special communications software (discussed below) to emulate a mainframe host system terminal and transfer the bar code data collected from transactions to the mainframe host 16. The individual data fields contained in the transactions are placed on the mainframe screen in the same row and column that they would be entered into if the user was typing the data on to the screen. The row and column that each data field is to be placed in is specified in the communication language program.

Figure 18:
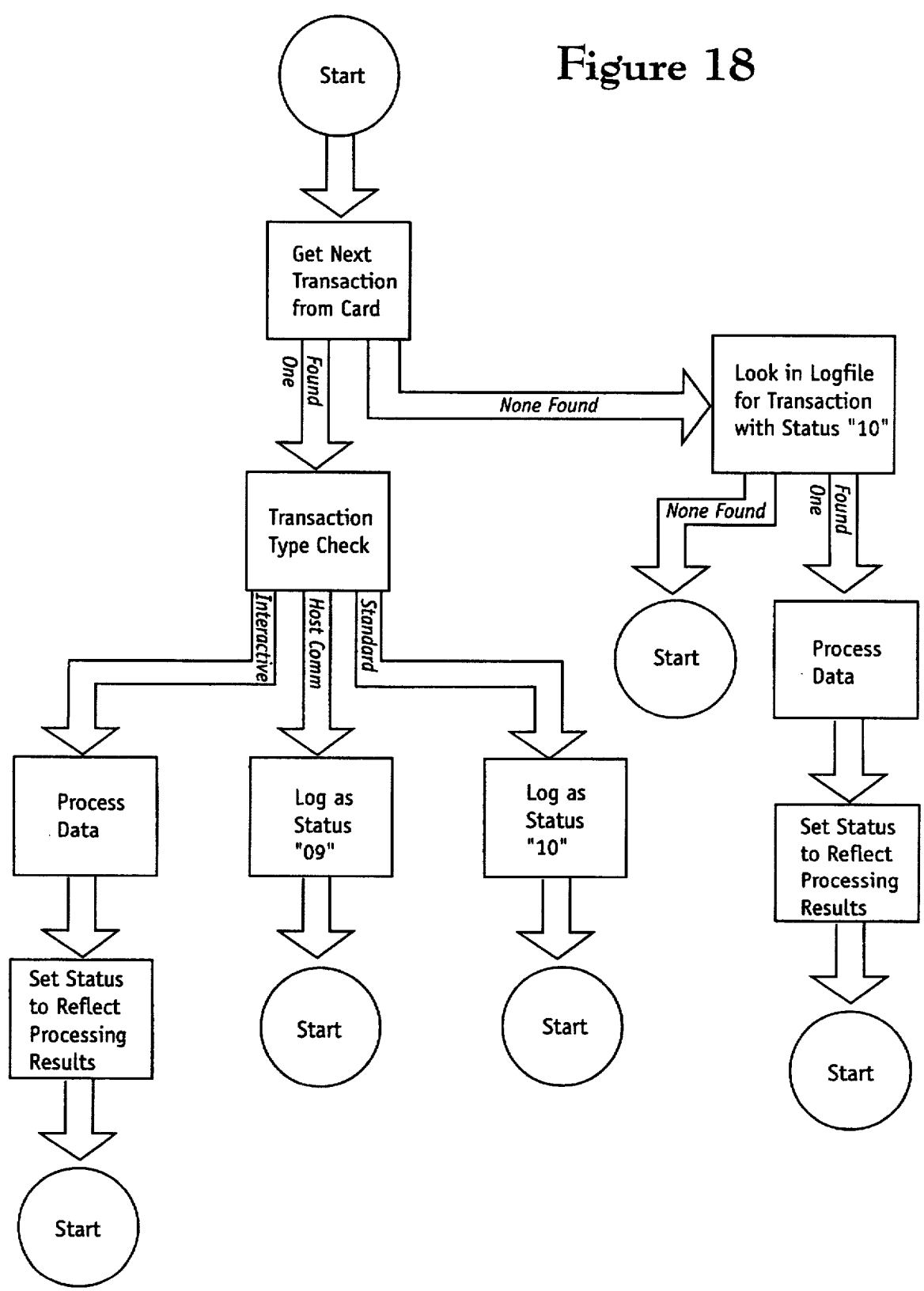
FIG. 18 is a block diagram illustrating the different known paths for transaction processing.
Figure 19:
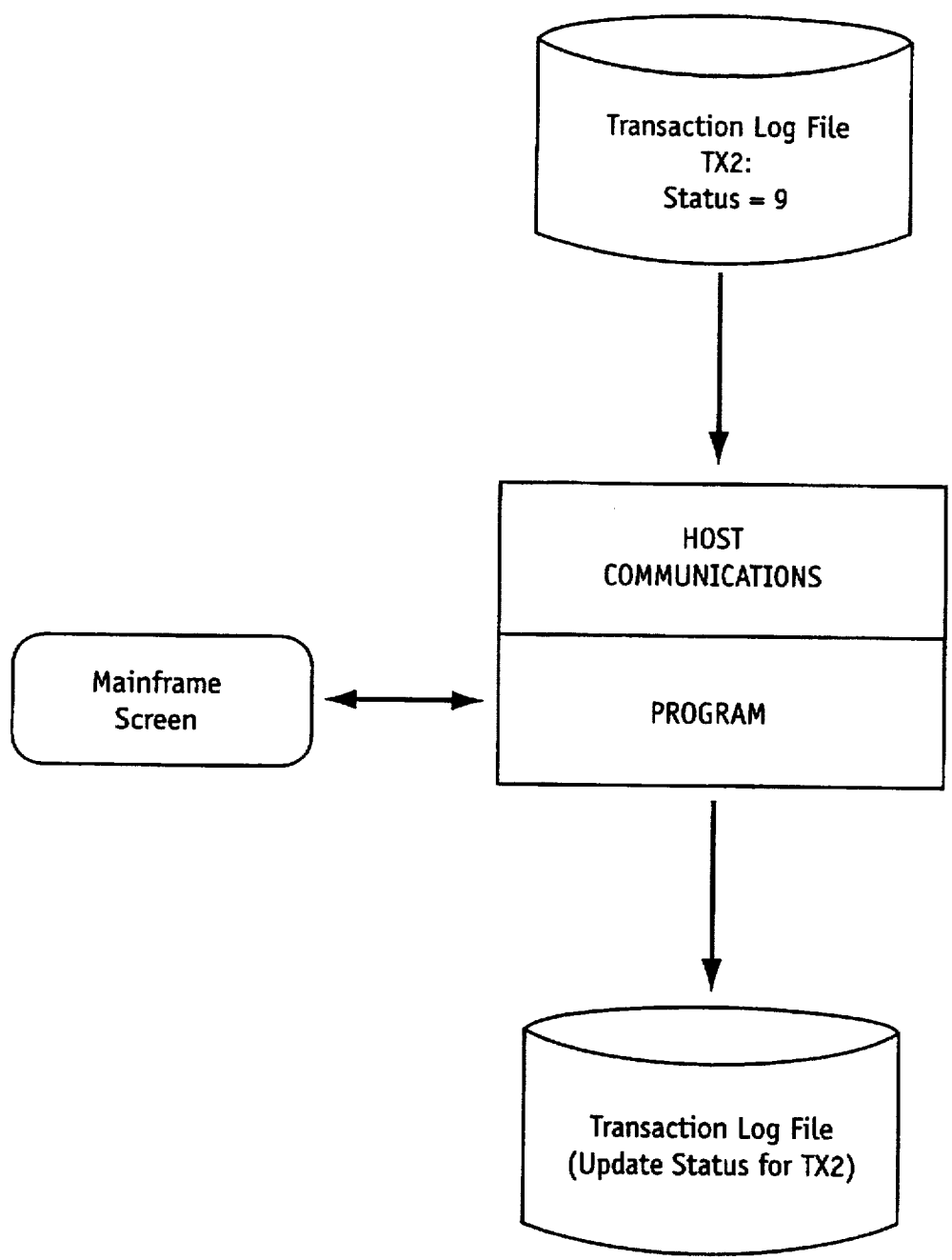
FIG. 19 is a diagram illustrating known on-line host communication.

Once the communications software is executed, the status of the transaction is updated to reflect the outcome. The new status is a "10" if the processing was successfully completed. No further processing is performed on the data. If there was a processing error, the new status is a "3". The user can then view the error, change the status and resubmit the data for processing. FIG. 18 outlines this extended processing path.

If the transaction has a status of "10", the transaction is a standard transaction. Standard transactions carry the lowest priority of the transaction types. If all of the transactions on the card have been pulled off, and there are no interactive transactions pending, the system begins to process standard transactions.

This processing includes executing a processing program (similar to interactive transactions). After extended processing has occurred, the log file status is updated to reflect the outcome. If the processing was successfully completed, no further processing is performed on the data. If there was a processing error, the new status reflects the appropriate error code. The user can then view the error, change the status and resubmit the data for processing. FIG. 17 shows this extended processing path.

The Processing Software

As noted above, the software used to develop processing programs may be written the C programming language. The processing programs are typically designed for processing transaction data collected from a network of bar code terminals. Essentially, processing programs are written to manipulate collected information. Such programs can process data that is already stored in a database, or they can handle data as it is being collected.

The processing programs consist of comments and command statements. A comment, as is well known, is a program statement that is not executed. Typically, comment lines describe what the subsequent command statement will accomplish. Command statements, however, contain instructions to be executed by the computer. The programming language offers the usual assortment of types of command statements, giving the user flexibility to handle almost any processing requirement. For example, the user can define temporary variables, specify mathematical calculations, if-else logic and while-loops, use database calls for inserting, updating, deleting or retrieving database records as required, specify interaction with terminal display screens, or specify communication with other terminals, printers and the like.

Temporary variables are used to store the results of program calculations and other command statements. Typically, the objective of a program is to add, delete, or update database tables. These tasks are accomplished using database command statements, or calls. Database calls specify the action to be taken. For example, the "insert" call adds new information to the database table.

Prior to updating the database, the user may wish to perform calculations on the data. Values used in calculations can come from the transaction itself, database tables or even temporary variables. Typical mathematical operators are available for use (i.e. +, −, ×, /, and %).

Database calls can also be used to retrieve data already stored in the database and compare it to the collected data. This provides the user with the option to validate data prior to further manipulation.

Once the data is validated, the user can subject the data to a plurality of "logic" tests using the "if-else" and/or "while" command statements. The scope of processing capabilities is expanded by supplementing these statement with logical operators (i.e. =, <, >, etc). As is known, these statements allow the user to determine if the data meets further criteria prior to modifying it or inserting it in a table. Because the outcome of these tests control the execution of the program, these command statements are also referred to as control statements.

Because programs often use the same set of command statements in more than one situation, "routines" can be created. Once established, one command statement can be used to perform the routine. As is known, program operation continues at the point in the program at which the routine was called. Using routines also helps to structure the program into task-specific blocks. The main block typically contains the basic operation of the program, and the routines carry out the details. Programs using routines are thus easier to read, understand and modify.

In addition to processing data collected from bar code transactions, the processing software can also be used to create programs that process data from screen transactions. These transactions do not involve bar code transactions, and are run from a user menu. Developing and running these screen processing programs involves creating the screen using the processing software's "screen painter," and using the processing software's "editor" to write a program that will display the screen and process the user's entries.

To gather data from a screen, the program must first call up the screen and then wait for the operator to enter the data. The data can then be processed as described above.

The processing software's screen painter is similar in nature to the screen painters accompanying the commercially available Paradox™ and RBase™ database systems. The painter allows the user to design and define special screen forms that are controlled by processing programs. Like the screen forms discussed above, these forms display and/or accept information. Unlike the other screen forms, however, which are accessed by menu, processing language screen forms are accessed by a processing program.

To create processing software screens, the user defines the screen's display characteristics (i.e. if there will be a border), places text and field markers, and defines the screen's fields attributes.

The processing software also provides an editor to aid in the creation and modification of processing programs. The editor is similar in nature to commercially available editors.

When using the editor, special keys and key sequences are used to perform tasks usually associated with an editor. These tasks, for instance, include inserting and/or deleting text, and "cutting and pasting" blocks of text.

Screen forms are provided to assist the user in creating the program. These forms help the user select an existing program to modify or create a new program, select the tables that will be affected by the program, specify the screens (created by the screen painter) that will be called by the program and enter the actual command instructions of the program.

The Communications Software

When the system finds an on-line transaction on card 12, the system invokes the communications software to set up communication for the on-line transactions. The communication software is includes three modules or programs, a sign-on program, a main or command program and a sign-off program. The sign-on program is used to sign-on the bar code workstation 14' to the mainframe host computer 16 and it's software and selects the appropriate host screen. For example, the sign-on program might select a host computer's Accounting Software and the screen for payroll information.

Figure 20:
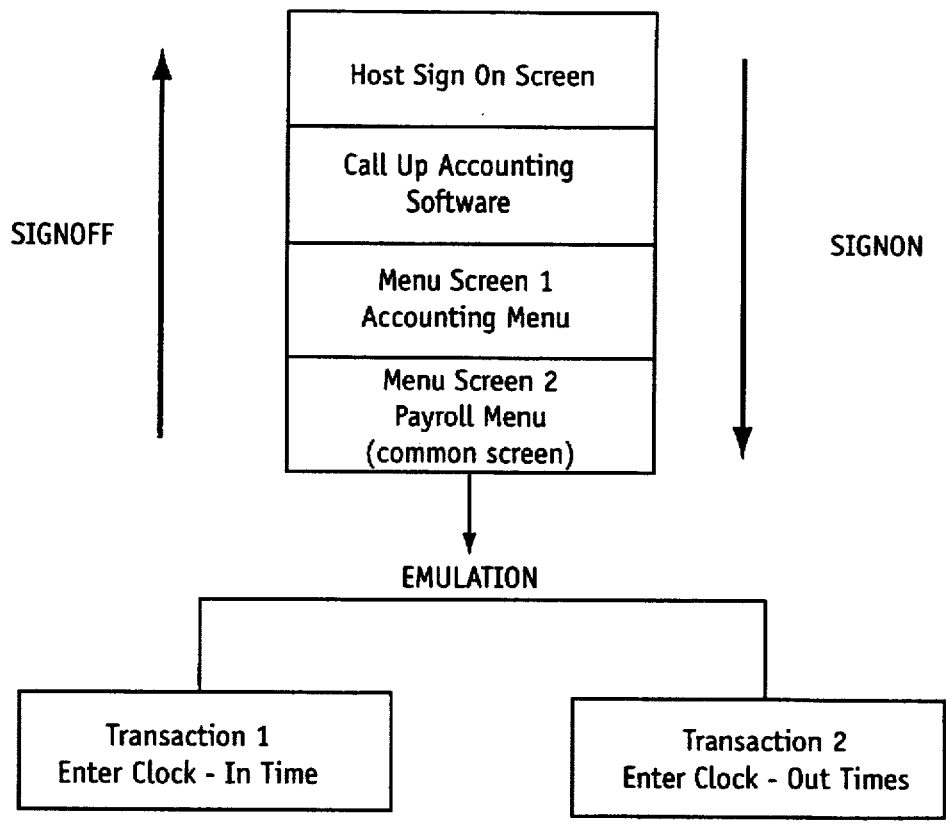
FIG. 20 is a block diagram illustrating a known common path to different entry screens.

Once the appropriate screen is selected, the command program processes the transactions as they are pulled from log file 17. The command program makes any additional screen and menu selections, inserts the transaction data onto the host screen and perform error checking. For example, the command program might insert the times at which an employee clocked-in and clocked-out. The command program is discussed in greater detail below. The sign-off program, as it's name implies, is used to backup from the host screens and log off of the host. FIG. 20 shows the process for signing-on, emulating the host screens and then signing-off.

Command programs are written to handle bar code transactions. One program can handle multiple transactions. However, each program is composed of five (5) different sections, or code blocks, for each on-line transaction definition. These sections are the Control section, the Screen section, the Fill section, the Exit section and the Error section. All sections except for the Control section have user-defined names, or labels.

The Control section is comprised of control lines. In a command program, there is one control line for each on-line transaction handled by the program. The program matches the transaction definition number with the appropriate control line. In addition to the transaction definition number, each control line contains each of the section labels. In this way, the control lines direct the program to the code blocks to be executed. The control lines can also contain messages that are displayed on the entry screen at a certain row and column position if the transaction is accepted by host computer 16.

Figure 21:
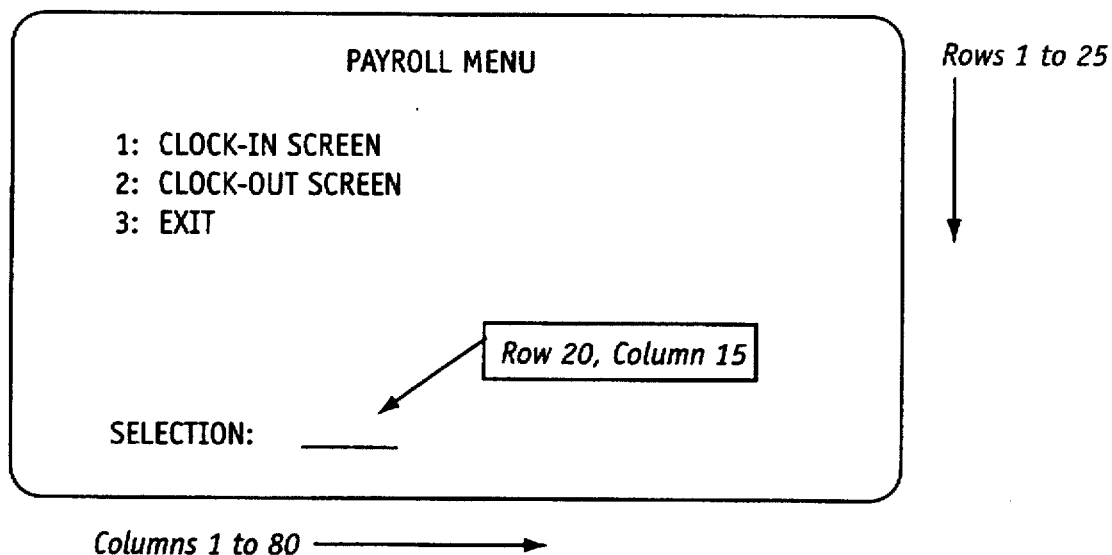
FIG. 21 is a diagram of a known sample host payroll menu.

The Screen section selects the proper entry screen on host computer 16. This section specifies the row and column position to fill, the value to insert, and an "accept" instruction which indicates to host computer 16 that data entry is complete. FIG. 21 shows a "Payroll Menu" screen to be selected. To select this screen, the Screen section would specify filling row 20, column 15 with a "1". This would result in the clock-in screen being selected.

Figure 22:
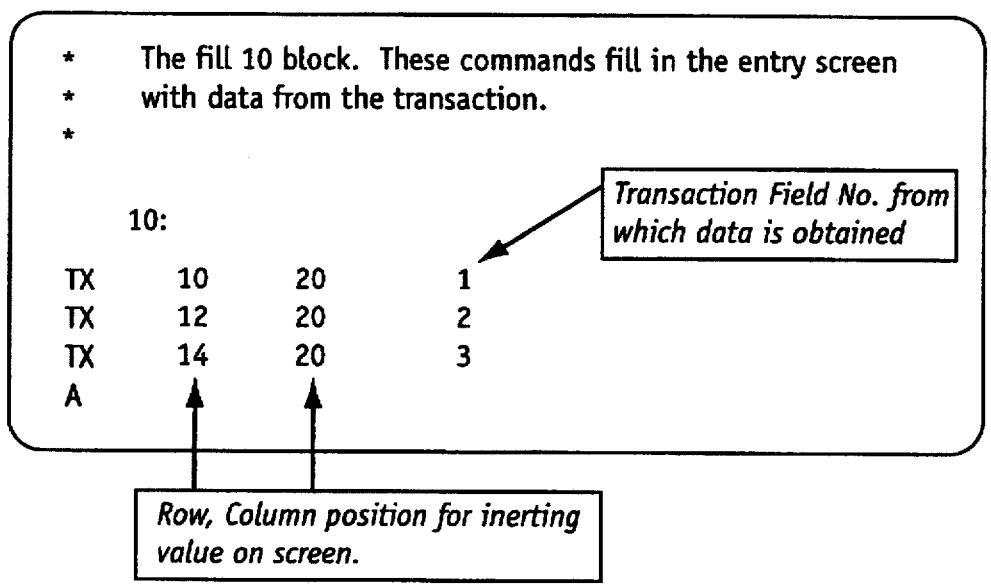
FIG. 22 is a diagram of a fill code block.

Once the appropriate screen has been selected, the Fill section takes each value from the transaction and inserts it in the designated position on the screen. Each instruction line in this block contains a row and column position indicator and a transaction field number. The value from that field is then used to fill the screen. An "accept" instruction indicates that data entry for this transaction is complete. A sample Fill section for a transaction definition (number 10) is shown in FIG. 22. Recall that FIG. 15 shows the Field Definition form for that transaction definition. When the first line of this Fill section is executed, the value from transaction field number 1 (emp. no.) would be inserted on the screen at row 10 and column 20. Similarly, the value from transaction field number 2 (tool ID#) would be inserted at row 12 and column 20.

The purpose of the Exit block is to return the operator to the screen first selected by the sign-on program. In effect, this block reverses the action of the Screen block, which found the appropriate screen for data insertion. This block is used when an incoming transaction is different from the previous transaction (i.e. a different screen will be used). One this block is executed, the Screen block for the new transaction can select the appropriate entry screen.

The Error section is executed only when the entered data is rejected by host computer 16. After the "accept" instruction that follows any instructions to fill a screen, the Command Program checks the host screen to see if the data was accepted or rejected. Each control line has a message and specifies where that message will be displayed on the entry screen if the transaction is accepted by host computer 16, as previously noted. For example, if the control line specifies the message "ok" to appear at row 23 and column 2, the Command Program checks row 23 and column 2 for the message after executing an "accept" instruction. If the message is there, the transaction data was accepted. The log file status is then updated to a "10" to indicate successful communication. If the message was not there, the transaction was rejected, and the log file status is updated to a "3" to indicate failed communications.

System Screen Painter

The system offers three tools for creating screen forms. These are the Auto Screen Generator, the processing software's screen painter and the System Screen Painter. The first two are discussed in greater detail herein above. The System Screen Painter is similar is nature to the screen painters associated with other commercially available database packages such as Paradox™ and RBase™.

Unlike the Auto Screen Generator, which allows the user to define basic screens that access a single database table, and the processing software's screen painter, which allows the user to create special screens controlled solely by processing programs, the System Screen Painter allows the user to create all types of screen—simple entry screens to detailed screens that interact with multiple tables and display numerous rows of data at once. This tool makes it easy to define even the most complex screens. This tool can also be used to enhance an existing basic screen.

The usual variety of screen forms allow the user to specify all aspects of screen forms. After naming the screen, the user defines the display characteristics (borders, cursors, etc.), defines the size of the scrollable regions, defines the screen layout (where fields will be positioned), defines the field attributes (display only, must fill, required entry, etc.), and specifies the table(s) that will interact with the screen.

The System Report Writer

With the Report Writer program, the user can design reports that display collected information in any order or format needed. Unlike the Auto Report Generator discussed above, which provides information from one database table, the System Report Writer allows data to be gather from multiple tables. Reports can be sent to a printer, sent to a bar code terminal display or stored in ASCII format on a disk. The System Report Writer is similar is nature to the report writers associated with other commercially available database packages such as Paradox™ and RBase™.

When defining and creating a report, the user specifies what and how information is to be reported through a series of screen forms. The user defines the type (screen, printer, file), format and other characteristics like margins, number of lines per page, header and footers. For those users unfamiliar with format characteristics, default values are provided by the system.

Because reports display information from tables, the user must select the database table(s) that store the information to be reported. If the report uses data from only one table, that table is selected as a target and a key field for locating the information is specified.

If the report uses data from multiple tables, the user specifies a relationship between the participating tables. To create this relationship, one table is declared the primary table, and each subsequent table is paired to the preceding table. Then, for each pair of tables, a common column is selected and used to line up related records from each table. This relationship is used to gather information from each table and display it as one report line.

After the tables have been specified, the user specifies if that table's contribution to the report is required. For example, let it be assumed that a "Tools Out" report shows which tools are out (by tool ID#) and how much that tool cost. Because the objective of the report is to see what tools have been logged out of a tool crib, if the tool ID# can not be determined, then the tool cost should not be reported. In this case, the table contributing the tool ID# is said to be required.

The user also controls the "look" of the report by deciding where to place fields and text on the report. The user also has the option of specifying the report to display data in either ascending or descending order, or restricting the report contents by eliminating records from the report based on values contained in any column. For example, a report shows tools checked out to a certain department by specifying a condition on the department column.

Administration

The system 10 also provides utilities to handle the known administrative aspects of database packages in general. These aspects include system security and backups, menu maintenance, file management and changing screen colors.

The Security System provides the ability to restrict user access to functions. Menu items and data tables have security levels and group numbers. Users also have security levels and group numbers. In order to invoke a menu item or manipulate a data table's contents, the user must have a security level greater than or equal to that of the menu item's level and belong to the item's group. This two-tiered approach allows the system to be customized so that personnel can access only appropriate menu items and data tables.

Security levels and groups can be modified to add or delete users. In addition, as screens and reports are generated and data tables are created, security levels and groups can be defined for these items.

The Menu Maintenance utility allows the user to create and modify menus as screens, reports and programs are created. In addition to creating altogether new menus, existing menus and sub-menus can be reorganized by adding new items and deleting unused items to suit expanding needs.

When desired, the user can perform a "backup" of information onto floppy disks. All information in the database can be backed up, or all information in the database plus the system software can be backed up. In addition, user-defined and created screens, reports and menus can also be backed. This information can then be recalled using the known "Restore" DOS command.

In order to facilitate full use of system applications, the user can copy data tables, transaction definitions, screens, reports and menus from one database to another. After specifying the source and destination databases (they must be different), pop-up menus display the items that are transferrable to the destination database.

The system 10 can be used on either monochrome or color displays. On color displays, the system uses different color to represent different screen areas and types of information. The user can customize these color combinations to suit his needs.

It is understood, of course, that while the forms of the invention herein shown and described constitute the preferred embodiments of the invention, they are not intended to illustrate all possible forms thereof. It will also be understood that the words used are words of description rather than limitation, and that various changes may be made without departing form the spirit and scope of the invention disclosed.

I claim:

1. A method for setting up a bar code network from a central location according to the requirements of a user for use with a host computer operable through a host computer terminal having at least one host screen with host data fields at predetermined row and column locations having at least one database, the bar code network including a plurality of data collection terminals, a plurality of workstations and a controller for transmitting and receiving bar code data made up of bar code transactions containing a plurality of bar code data fields to and from the terminals over a communications line, the method comprising the steps of:

selecting at least one database;

configuring the terminals;

testing the terminals;

each of the steps of selecting, configuring and testing is performed from the central location;

selecting any one of said workstations as the central location;

wherein said configuring step includes emulating said host computer terminal by associating individual bar code data fields contained in said bar code transactions with the row and column locations of host data fields on said host screen to thereby configure said bar code network to supply bar code transactions to said host computer as if entered through said host computer terminal;

wherein said testing step includes the steps of choosing a number of terminals in the network to be tested, selecting a duration of a test to be conducted and reporting test results based upon the test; and wherein said database selecting step includes the steps of identifying a storage location for the collected bar code data, and identifying a storage location for validation data and processing programs.

2. The method as claimed in claim 1 further comprising the step of assigning a bar code printer to any of the terminals from the central location.

3. The method as claimed in claim 1 further comprising the steps of configuring the communications line to each of the terminals and workstations from the central location, and of providing default communications line parameters to a user at the central location.

4. The method as claimed in claim 1, wherein the bar code network collects bar code transactions and wherein the method further comprises the step of configuring the terminals and the controller from the central location to generate, maintain and automatically update a backup copy of the bar code transactions as said bar code transaction data is collected.

5. A system for setting up a bar code network from a central location according to the requirements of a user in combination with a host computer operable through a host computer terminal having at least one host screen with host data fields at predetermined row and column locations having at least one database, the bar code network including a plurality of data collection terminals, a plurality of workstations and a controller for transmitting and receiving bar code data made up of bar code transactions containing a plurality of bar code data fields to and from the terminals over a communications line, the system comprising:

means for selecting at least one database;

means for configuring the terminals;

means for testing the terminals;

each of the means for selecting, configuring and testing are controlled from the central location;

wherein any of said workstations is usable as the central location;

means for designating any one of said workstations as the central location;

wherein said configuring step includes emulating said host computer terminal by associating individual bar code data fields contained in said bar code transactions with the row and column locations of host data fields on said host screen to thereby configure said bar code network to supply bar code transactions to said host computer as if entered through said host computer terminal;

wherein said means of selecting a database determines a storage location for incoming transactions, selects a processing unit for processing bar code data and communicates said terminals with validation data and processing programs;

wherein said testing means comprises means for selecting the terminals to be tested, means for selecting a duration test to be conducted and means for reporting test results; and wherein said testing means tests the communication lines of the terminals selected for testing.

6. The system as claimed in claim 5 further comprising a bar code printer and means for assigning the bar code printer to any of the terminals, from the central location; and means for presenting screen forms to a user at the central location to assist the user in using said data base selecting means, said terminal configuration means, and said testing means.

7. The system as claimed in claim 5 further comprising means for configuring the communications line for each of the terminals and workstations from the central location, and for providing to a user at the central location default communications values for each communications line.

8. The system as claimed in claim 5 wherein the bar code network collects bar code transactions and wherein the system further comprises means for generating, maintaining and updating a backup copy of the bar code transactions as said bar code transaction data is collected.

* * * * *